(12) United States Patent
Concilio et al.

(10) Patent No.: US 8,032,416 B2
(45) Date of Patent: Oct. 4, 2011

(54) METHOD FOR THE DECOMPOSITION IN MODULES OF SMART-CARD EVENT-DRIVEN APPLICATIONS

(75) Inventors: Mariano Concilio, Scafati (IT);
Francesco Varone, Bellona (IT);
Amedeo Veneroso, Ercolano (IT)

(73) Assignee: Incard SA, Geneva (CH)

( * ) Notice: Subject to any disclaimer, the term of this patent is extended or adjusted under 35 U.S.C. 154(b) by 2747 days.

(21) Appl. No.: 10/725,193

(22) Filed: Dec. 1, 2003

(65) Prior Publication Data
US 2005/0119940 A1   Jun. 2, 2005

(51) Int. Cl.
*G06Q 20/00* (2006.01)
(52) U.S. Cl. ............................ 705/18; 705/21
(58) Field of Classification Search ...... 705/18
See application file for complete search history.

(56) References Cited

U.S. PATENT DOCUMENTS 5,380,991 A * 1/1995 Valencia et al. .............. 235/383
6,311,165 B1 * 10/2001 Coutts et al. .................... 705/21

* cited by examiner

*Primary Examiner* — Faris Almatrahi
(74) *Attorney, Agent, or Firm* — Lisa K. Jorgenson; Allen, Dyer, Doppelt, Milbrath & Gilchrist, P.A.

(57) ABSTRACT

A method for separating an event-driven application in an electronic device is provided. The electronic device includes a smart-card, and the application resident in the smart-card may be separated in at least two modules: a central module and one or more complementary modules. The method includes managing the interaction between the modules by a framework of the smart-card, and generating new set of events by the framework at the end of execution of the central module. In this manner, the central module can be developed early in production and in any set of programming languages. It can access any card resources and even in an architecture dependent way.

28 Claims, 4 Drawing Sheets

METHOD FOR THE DECOMPOSITION IN MODULES OF SMART-CARD EVENT-DRIVEN APPLICATIONS

FIELD OF THE INVENTION

The present invention relates to a method for the decomposition of an application in an electronic device, and more particularly, for the decomposition of an event-driven application in at least two modules.

The electronic device may be a terminal of a wired or wireless communication system including a plurality of exchanges structured to receive and transmit signals among terminals. The electronic device may be a mobile telephone or a point of sale terminal including a smart card with resident event-driven applications that are suitable to be decomposed in at least two modules.

The present invention further relates to such an electronic device and to a smart card that may be used in such a device. The present invention also relates to applications compliant to event-driven paradigm in smart-card environments, subject of being decomposed in two modules, each of which including specific features.

BACKGROUND OF THE INVENTION

As shown in FIG. 1, an electronic device 1 including a smart card 2 is set up to operate according to an event-driven example. One of the fundamental modules of the smart card is referred to as a framework 4, such as a terminal interface protocol manager for example. The framework belongs to a given processing environment, such as an operating system waiting for a set of external actions.

For a better understanding of the present invention, hereinafter an "event" will be referred to as any significant action performed by an external entity 7 that involves the processing environment in the electronic device 1. The external entity 7 is also referred to as the "world" in the schematic of FIGS. 1 and 2, and may be a user or a network to which a terminal is linked. In other words, the world 7 can be a user or the communication network that interacts with the smart-card 2 or the terminal itself.

Once an event has occurred the framework 4 is triggered, invoking a predetermined sub-program that is an autonomous programming application provided with an independent lifecycle. This programming application is loaded on the processing environment and has somehow negotiated with the framework the decision to be associated with a specific event.

This kind of negotiation may be called "event registration". Thus, the application has substantially two opportunities: a first opportunity for managing the occurred event, or a second opportunity for reacting according to the quality of the event. Registration of an event and triggering of the framework 4 is achieved due to a well-defined interface between the framework and the programming application.

When an event takes place, however, before triggering a target programming application, the framework 4 usually performs standard operations related to its own responsibilities regarding that event. Only after completion of these standard operations, the framework 4 calls registered programming applications and finally performs further operations to complete event-related resource management.

The framework 4 is one of the elements of the processing environment, such as the smart-card 2. Many applications can be functionally separated in a central module 5 and one or more complementary modules 6. Suppose that a programming application that is called to react after an event might be functionally separated in several modules 5, 6. The separation is such that the modules can be described as follows:

1) A central module 5 that is structured to comply to the following duties: a) performing main operations directly linked to an event, such as administrative operations; b) implementing well-known and/or stable behavior fulfilling requirements of most products and without needing frequent upgrades after issue; and c) optionally, its implementation is correlated to the system architecture of the processing environment, and more particularly, if development of the module is difficult, this development can be done only by an expert development team skilled or trained on that system architecture, and/or requiring, partially or totally, architecture-dependant programming language.

2) One or more complementary modules 6, which are structured to comply to one or more of the following duties: a) performing complementary operations to be started after completion of the central module processing, e.g., user or network notification, resource de-allocation etc.; b) optionally, the complementary operations must be started after the completion of central module 5 processing and after the framework 4 has completed the event management; c) accessing to the same input data of the central module, as well as to its output data, d) implementing specific product or specific customer requirements, such as user interactions or network acknowledging with specific data; e) being subject to a rapid and/or custom development, for instance using high level or portable language, with system architecture hiding; f) they can be developed by third-parties not skilled on the system architecture or not qualified to access to the system programming resources; g) the requirements may be unknown at application release; h) the requirements may be eligible to change during product life cycle and could be upgraded on the field; and i) a small memory usage is expected.

The easiest way to implement this separation is by allowing the central module 5 to invoke the complementary module 6 as an external program. An example of this possible structure is shown in FIG. 3. A practical case concerning a Smart-Card Application Architecture, such as a 3GPP 43.019 SAT Application (SIM Application Toolkit) will now be considered. This provides a mechanism for triggering and an event registration of the previously disclosed kind.

A hypothetical applet that respects the previous duties (1) and (2) can comprise two modules. Both a central module 5 and a complementary module 6 can be developed as distinct Javacard applets. The complementary applet, however, is provided with a shareable interface exported to the central module 5, which has the function of calling the complementary module 6.

The central module 5 is most eligible to be developed also in architecture-dependant or Javacard with partial native implementation. The complementary module 6 can be loaded, installed and updated also on the field, via a Remote Applet Management.

A further example will now be considered. For instance, in a computer based system the complementary module 6 can be written as a stand-alone executable, called within the central module 5 with proper operating system APIs. In this case, step 3 of FIG. 2 is a command that executes an external program, usually provided by an operating system.

Both the above approaches present some drawbacks. A first disadvantage is due to the fact that the definition of a non-standard interface is required to achieve inter-module communication and inter-module run-time linking management.

In other words, both modules shall comply to a precise communication protocol, more or less complex, to exchange input and output data. Moreover, the central module shall dynamically manage the potential presence of the complementary module.

These approaches still require the framework completing its duties before starting the complementary operations. In other words, good performances must rely on the ability of the framework 4 to complete event management before the triggering of a complementary module 6. For instance, the complementary module 6 should run in a clear and unambiguous condition when the definitive result of event processing is known.

As an example, with reference to an application toolkit environment, the SIM is allowed to return data (9Fxx) before the complementary module is triggered. On the contrary, with reference to a GUI based operating system, this would be desirable to permit the redrawing, or generally speaking, the unlocking of a GUI resource such as a window or a button before execution of the complementary module.

SUMMARY OF THE INVENTION

In view of the foregoing background, an object of the present invention is to achieve an enhanced event-driven programming with application separation in smart-card applications, a simplified inter-module communication and a standardized inter-module run-time linking management.

One embodiment of the present invention relates to a method for the separation of an event-driven application in an electronic device including a smart-card, and wherein the application resident in the smart-card may be separated in at least two modules—a central module and one or more complementary modules.

The method comprises managing the interaction between the modules by a framework of the smart-card, and generating new set of events by the framework at the end of execution of the central module. In other words, the framework manages the interaction between modules using reiterated event generation.

Another embodiment of the present invention relates to an electronic device including a smart card set up to operate according to the above method.

BRIEF DESCRIPTION OF THE DRAWINGS

The features and advantages of the method and device according to the present invention are made apparent by the following description of an embodiment thereof, given by way of non-limiting examples with reference to the accompanying drawings.

In the drawings.

DETAILED DESCRIPTION OF THE PREFERRED EMBODIMENTS

Figure 2:
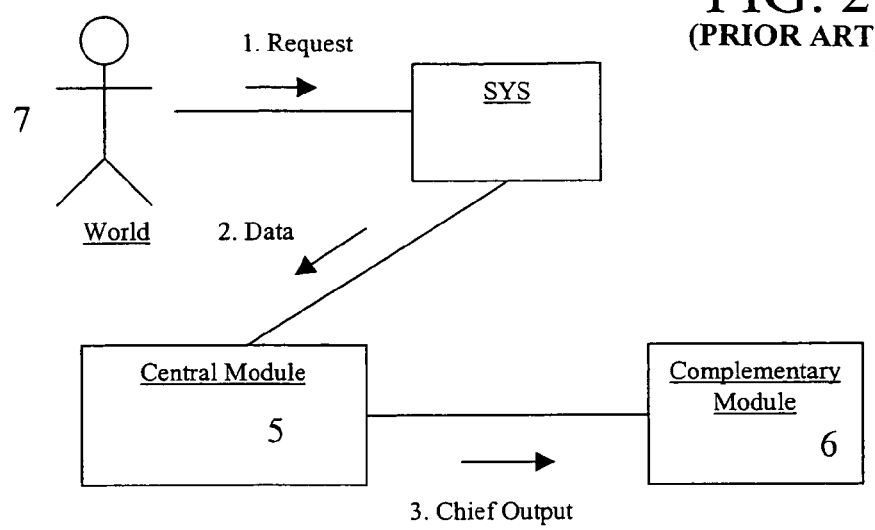
FIG. 2 schematically shows a typical event-driven smart-card system operation according to the prior art.
Figure 1:
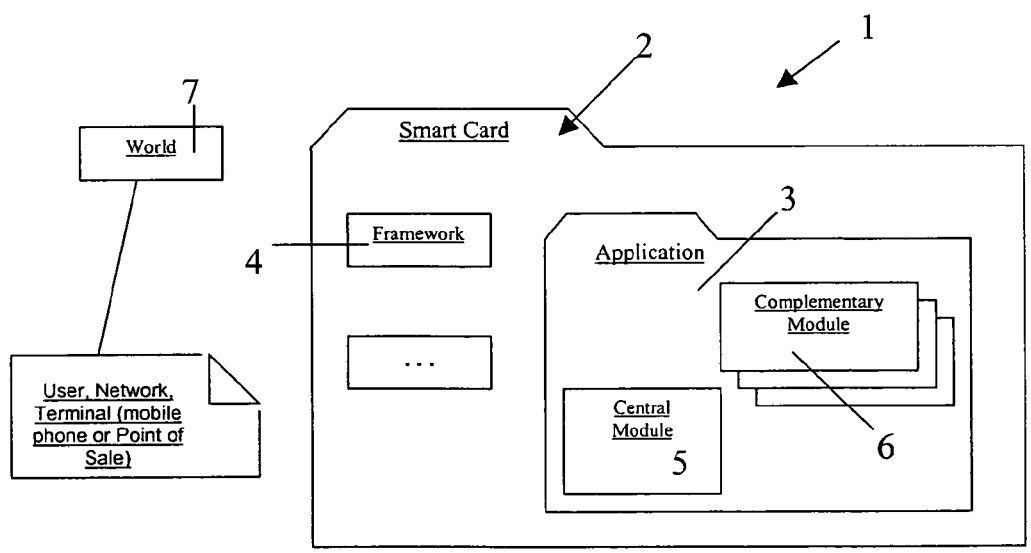
FIG. 1 schematically shows an electronic device including a smart-card system comprising a framework, a central module and one or more complementary modules according to the prior art.
Figure 3:
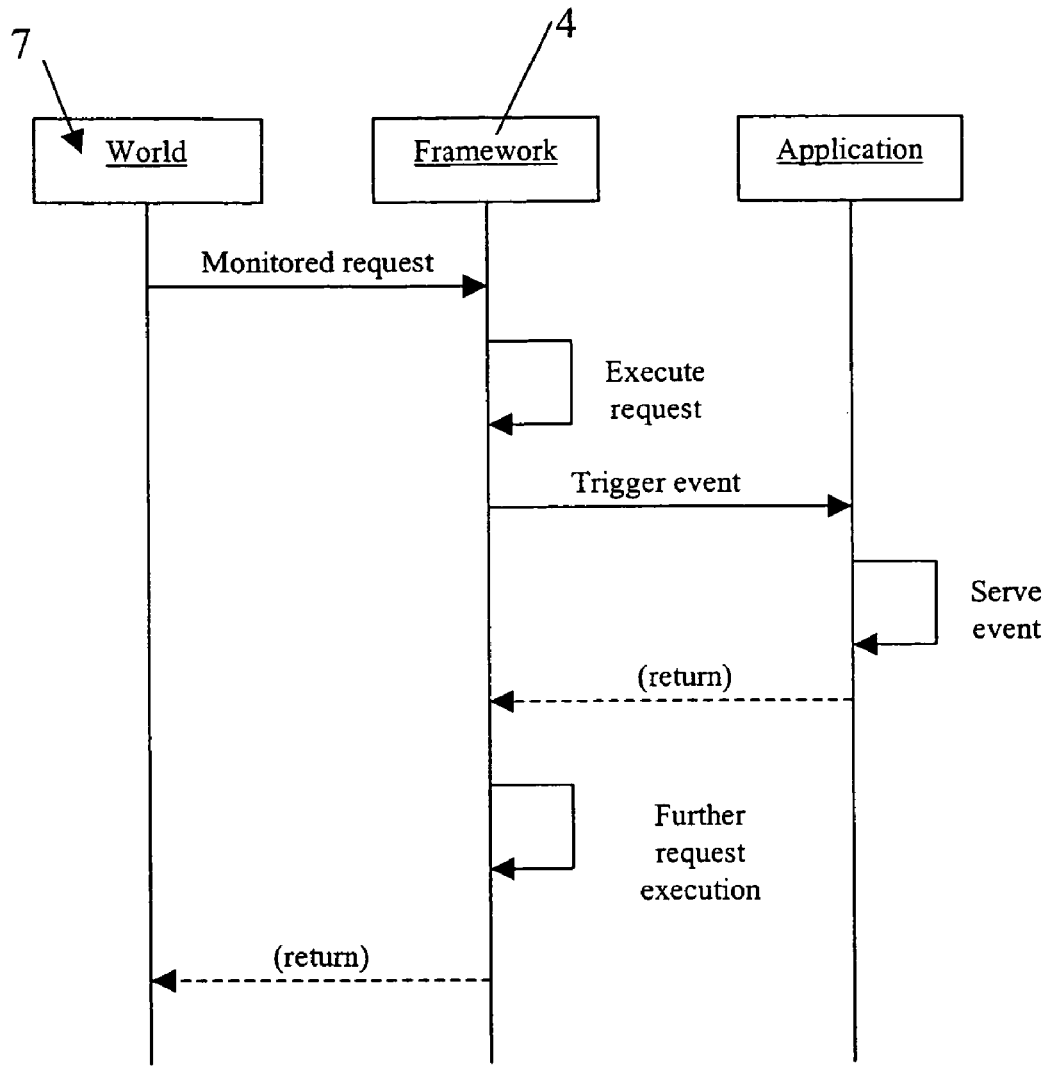
FIG. 3 schematically shows typical event-driven system data flow involving a complementary module according top the prior art.

With reference to the drawings, an electronic device 1 is shown generally at 1 and includes a resident smart-card 2 comprising a framework 4, a central module 5 and one or more complementary modules 6. According to the invention, the smart card applications may be separated in the central module 5 and in one or more complementary modules 6.

The invention proposes a method to separate an event-driven application and to manage the interaction between the modules 5, 6 using reiterated event generation. The innovation is that the management between the two modules is completely handled by the framework 4 by standard mechanisms and by the introduction of a new set of events. These events do not represent the occurrence of action performed by an external entity, as provided in the prior art, but simply the end of execution of the central module 5.

In other words, according to the present invention the framework is managing the interaction between the central module and the complementary modules using reiterated event generation. The framework 4 substantially takes the place of the external entity 7.

Figure 4:
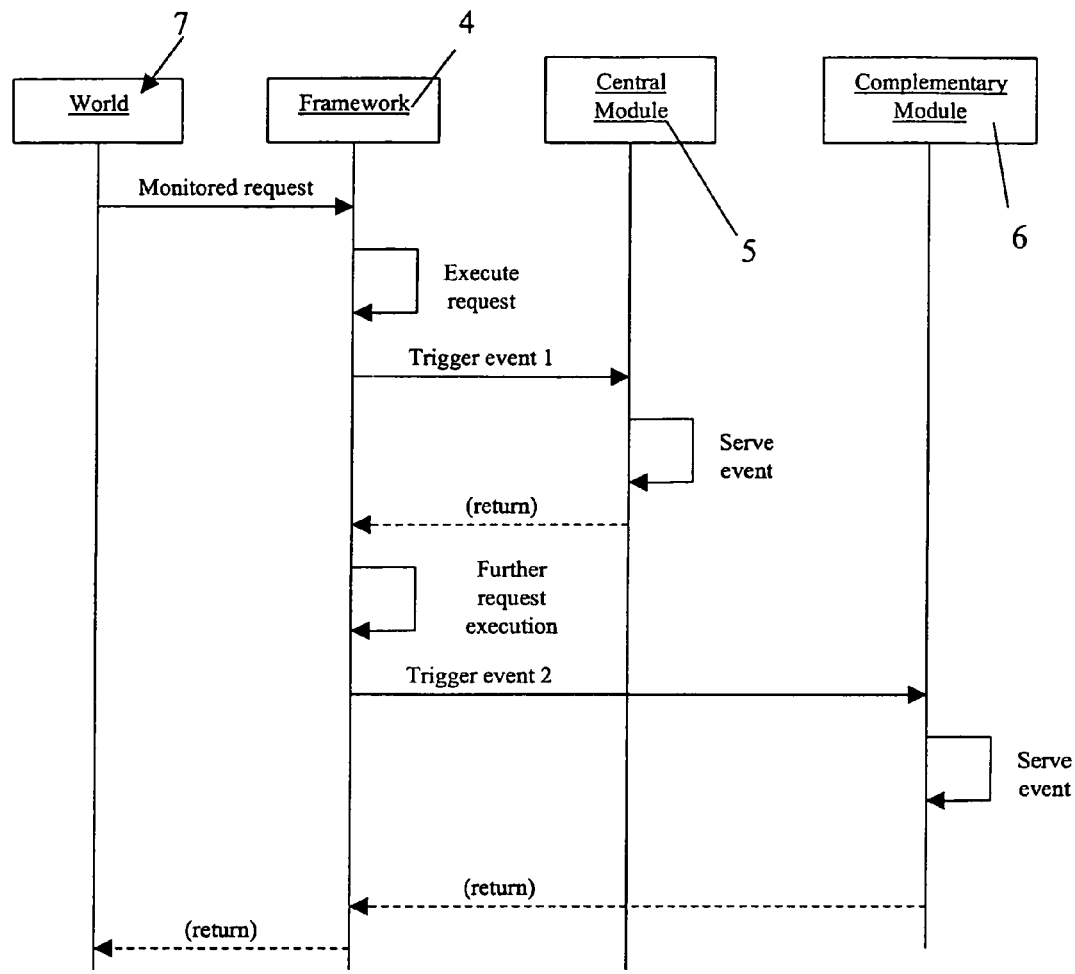
FIG. 4 schematically shows a new event-driven system data flow according to the present invention.

The framework 4 generates a new event just after the completion of the first module execution, and optionally, after completing any remaining framework event-related task, as clearly shown in FIG. 4. While the central module 5 registers itself to the usual event and it is triggered in the standard way, each complementary module 6 is registered to the appropriate new event.

Execution of the complementary modules 6 is started just after completion of the central module 5. Also, the complementary modules are called to start an event processing in a standard way. The interface to be provided is defined by the framework, and is common to central module 5 and to the complementary modules 6.

A specific example in a SAT smart card will now be considered. As an SMS message arrives to the electronic device including the smart card 2, the central module 5 is invoked by framework 4 with the following specific event: "EVENT UNFORMATTED SMS POINT TO POINT". After execution, the framework 4 does not stop execution as in the prior art, but invokes complementary modules 6 with a different event, for instance: "Notification Incoming Event".

Figure 5:
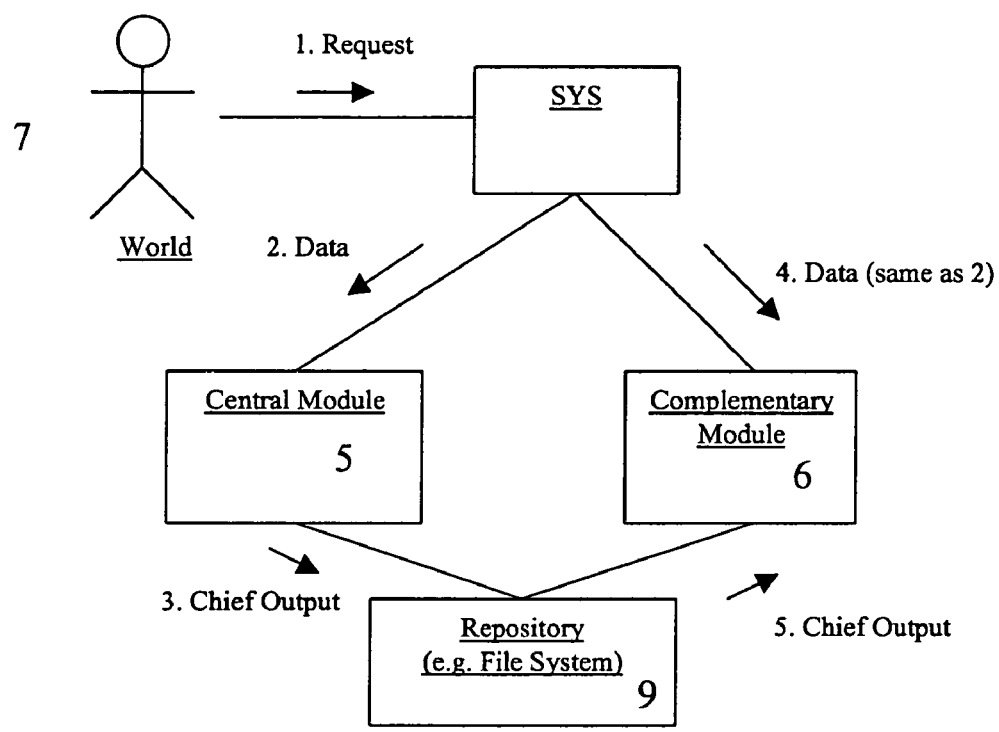
FIG. 5 schematically shows a new event-driven smart-card system operation according to the present invention.

The complementary modules 6 can be provided with the same input data delivered to the central module 5, if any, through the same mechanism as the original event, i.e., through the envelope buffer. Moreover, the complementary modules 6 can be provided with data concerning the central module execution. This can be done via any shared repository available to both central and complementary modules, as shown in FIG. 5.

For example, the central module output can be stored in the file system block 9. Advantageously, the central module and the complementary modules reside in separate and structurally independent memory spaces. For instance, the central module is stored in a read only memory, such as a ROM, while the complementary modules are stored in a programmable memory device, such as an EEPROM.

In some specific contexts it can be required that the data inputs and outputs of the central module 5 have to be protected against arbitrary accesses by any application. To achieve this scope, an authentication can be required to the complementary module 5 to gain access to sensible data. A way to authenticate an application, as an example, can be the AID (application identification number) or a cryptographic handshaking.

The method of the present invention solves a technical problem and achieves many advantages with respect to the prior art approaches. The central module can be developed in an early step of production, in any set of programming languages. It can access any card resources and even in an architecture dependent way. Moreover, since the method is not constrained by specific customer requirements, it can be integrated in the smart card operating system and/or stored in low cost and/or read only resources (such as ROM).

The complementary modules of the invention are architecture independent so they can be developed in the standard architecture-independent language, e.g., "Javacard." This allows a rapid and custom code development. Moreover, they can be loaded on card potentially at any time, not only at product release time without affecting the central module.

This allows the requirements of the user to be kept unknown at application release. In fact, it can be loaded on any platform compliant to Javacard and also over-the-air with standard protocols, such as 3GPP 23.048. Since they are usually small, they can be stored in R/W persistent memory with low impact on memory allocation.

Consequently, the central and complementary modules can ignore the presence of each other. The central module does not have to be aware about the number or simply the presence of complementary modules. Both modules can rely on a standard interface with the framework. This approach insures backward and forward compatibility of framework as well as modules, and improves code reusability.

As this invention does not require any changes in interface (except for tagging of new events), it has a low impact on modules' development techniques and requires a minimal impact on the framework. From the foregoing it will be appreciated that, although specific embodiments of the invention have been described herein for purposes of illustration, various modifications may be made without deviating from the spirit and scope of the invention. Accordingly, the invention is not limited except as by the appended claims.

That which is claimed is:

1. A method for executing an event-driven application in an electronic device including a smart-card, the application being resident in the smart-card and being decomposed into a central module and at least one complementary module, the method comprising:
managing interaction between the modules by a framework of the smart-card; and
after at least beginning execution of the central module by the framework based upon an external event, generating a new set of internal events by the framework for managing the at least one complementary module.

2. A method according to claim 1, wherein the framework generates the new set of internal events after completing execution of the central module.

3. A method according to claim 1, wherein the framework generates the new set of internal events after completion of a remaining framework event-related task by the central module.

4. A method according to claim 1, wherein the at least one complementary module is registered and triggered based upon a new internal event.

5. A method according to claim 1, wherein an interface defined by the framework is provided to the central module and to the at least one complementary module.

6. A method according to claim 1, wherein input data delivered to the central module is also delivered to the at least one complementary module.

7. A method according to claim 1, wherein the framework comprises a fundamental module associated with an operating system of the smart-card.

8. A method according to claim 7, wherein the fundamental module functions as a terminal interface protocol manager.

9. A method for executing an event-driven application resident in a smart-card comprising a fundamental module, the application being separated into a central module and at least one complementary module, the method comprising:
managing interaction between the central module and the at least one complementary module by the fundamental module; and
after at least beginning execution of the central module by the fundamental module based upon an external event, generating a new internal event by the fundamental module for managing the at least one complementary module.

10. A method according to claim 9, wherein the fundamental module generates the new internal event after completing execution of the central module.

11. A method according to claim 9, wherein the fundamental module generates the new event after completion of a remaining fundamental module event-related task by the central module.

12. A method according to claim 9, wherein the at least one complementary module is registered and triggered based upon a new internal event.

13. A method according to claim 9, wherein an interface defined by the fundamental module is provided to the central module and to the at least one complementary module.

14. A method according to claim 9, wherein input data delivered to the central module is also delivered to the at least one complementary module.

15. A method according to claim 9, wherein the fundamental module is associated with an operating system of the smart-card.

16. A method according to claim 15, wherein the fundamental module functions as a terminal interface protocol manager.

17. An electronic device comprising:
a smart card having an event-driven application resident therein, the application being separated into a central module and at least one complementary module, said smart card also comprising a framework for
managing interaction between the central module and the at least one complementary module, and
after at least beginning execution of the central module by the framework based upon an external event, generating a new internal event by the framework for managing the at least one complementary module.

18. An electronic device according to claim 17, wherein said framework generates the new internal event after completing execution of the central module.

19. An electronic device according to claim 17, wherein said framework generates the new internal event after completing a remaining framework event-related task.

20. An electronic device according to claim 17, wherein the at least one complementary module is registered and triggered based upon a new internal event.

21. An electronic device according to claim 17, wherein an interface defined by said framework is provided to the central module and to the at least one complementary module.

22. An electronic device according to claim 17, wherein input data delivered to the central module is also delivered to the at least one complementary module.

23. An electronic device according to claim 17, wherein said framework comprises a fundamental module associated with an operating system of said smart-card.

24. An electronic device according to claim 23, wherein said fundamental module functions as a terminal interface protocol manager.

25. An electronic device according to claim 17, wherein said smart card comprises first and second memories; and wherein the central module resides in said first memory and the at least one complementary module resides in said second memory.

26. An electronic device according to claim 25, wherein said first memory comprises a read only memory and said second memory comprises a programmable memory.

27. An electronic device according to claim 17, wherein the electronic device is configured as a mobile telephone.

28. An electronic device according to claim 17, wherein the electronic device is configured as a point of sale terminal.

* * * * *

UNITED STATES PATENT AND TRADEMARK OFFICE
CERTIFICATE OF CORRECTION

PATENT NO. : 8,032,416 B2  Page 1 of 1
APPLICATION NO. : 10/725193
DATED : October 4, 2011
INVENTOR(S) : Concilio et al.

It is certified that error appears in the above-identified patent and that said Letters Patent is hereby corrected as shown below:

Title Page, Item (57)
Abstract, Line 8        Insert: --a--

Column 2, Line 31       Delete: "to" (2nd occurrence)

Column 3, Line 33       Insert: --a-- before "new"

Column 3, Line 56       Delete: "top"
                        Insert: --to--

Column 5, Line 9        Insert: --a-- before "card"

Signed and Sealed this
Tenth Day of April, 2012

David J. Kappos
*Director of the United States Patent and Trademark Office*